United States Patent
Oyenan et al.

(10) Patent No.: US 11,093,814 B2
(45) Date of Patent: Aug. 17, 2021

(54) METHOD AND SYSTEM FOR AUTOMATICALLY DETECTING AND RESOLVING ACCIDENTAL EMERGENCY CALLS

(71) Applicant: MOTOROLA SOLUTIONS, INC, Chicago, IL (US)

(72) Inventors: Walamitien H. Oyenan, Elk Grove Village, IL (US); Zheng Fang, Chicago, IL (US); Mariya Bondareva, Bolingbrook, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 755 days.

(21) Appl. No.: 15/960,695

(22) Filed: Apr. 24, 2018

(65) Prior Publication Data

US 2019/0325288 A1    Oct. 24, 2019

(51) Int. Cl.
| | | |
|---|---|---|
| *G06N 3/00* | (2006.01) | |
| *H04M 3/51* | (2006.01) | |
| *G06N 5/04* | (2006.01) | |
| *G06N 7/00* | (2006.01) | |
| *G06N 99/00* | (2019.01) | |
| *G06N 20/00* | (2019.01) | |
| *G10L 25/63* | (2013.01) | |
| *G06F 40/40* | (2020.01) | |

(52) U.S. Cl.
CPC .............. *G06N 3/006* (2013.01); *G06N 5/04* (2013.01); *G06N 7/005* (2013.01); *G06N 20/00* (2019.01); *H04M 3/5116* (2013.01); *G06F 40/40* (2020.01); *G10L 25/63* (2013.01)

(58) Field of Classification Search
None
See application file for complete search history.

(56) References Cited

U.S. PATENT DOCUMENTS

| | | |
|---|---|---|
| 5,742,674 A | 4/1998 | Jain et al. |
| 6,249,674 B1 | 6/2001 | Verdonk |
| 6,662,026 B1 | 12/2003 | Cordray et al. |
| 9,071,952 B2 | 6/2015 | Matsuo et al. |
| 9,729,711 B2 | 8/2017 | Matsuo et al. |

(Continued)

FOREIGN PATENT DOCUMENTS

CN    206726038 U    12/2017

OTHER PUBLICATIONS

International Search Report and the Written Opinion corresponding patent application No. PCT/US2019/026238 filed Apr. 8, 2019, dated Jul. 3, 2019, all pages.

*Primary Examiner* — Harry S Hong

(57) ABSTRACT

An example method and apparatus for processing accidental emergency calls is provided herein. The example method includes monitoring an emergency call with an active learning artificial intelligence (AI) bot implemented by a processor. The example method further includes determining, by the AI bot, that the emergency call was disconnected prior to a call taker resolving the emergency call. The example method additionally includes providing, by the AI bot, a score indicative of the likelihood that the emergency call was an accidental call, wherein the call may be based on real-time and historical data. The example method also includes recommending, by the AI bot, a response to the emergency call based upon the score.

20 Claims, 3 Drawing Sheets

(56) References Cited

U.S. PATENT DOCUMENTS

| | | | |
|---|---|---|---|
| 2009/0290688 A1* | 11/2009 | Peters | H04M 3/436 |
| | | | 379/37 |
| 2013/0083902 A1* | 4/2013 | Goswami | H04W 4/029 |
| | | | 379/37 |
| 2015/0094034 A1* | 4/2015 | Matsuo | H04M 1/72424 |
| | | | 455/414.1 |
| 2015/0215454 A1* | 7/2015 | Matsuo | H04W 4/16 |
| | | | 455/414.1 |

* cited by examiner

METHOD AND SYSTEM FOR AUTOMATICALLY DETECTING AND RESOLVING ACCIDENTAL EMERGENCY CALLS

BACKGROUND

Many localities around the world provide a system for the public to rapidly request assistance in case of an emergency. For example, in the United States of America the 9-1-1 system may be used to request assistance from police, fire, or emergency medical services (EMS) first responders by simply dialing 911 on any telephone, including both landline and wireless telephones. The United Kingdom provides similar functionality through the 9-9-9 system. Other localities may provide similar functionality through locally known emergency phone numbers.

In many localities, it has been mandated that any phone that is able to power on and connect to any network must be allowed to access the local emergency number. For example, a wireless phone that is missing a subscriber identity module (SIM) card or which does not have a current valid subscription to any wireless network provider would still be able to place a call to the local emergency number. In many localities it is mandated that a wireless phone must be able to access the emergency number even when in a locked state, without requiring the user to first unlock the phone.

Accidental calls to the emergency system can cause resources to be expended unnecessarily. At minimum, any time spent on an accidental emergency call by an emergency call taker is time that could not be spent on a legitimate call. Accidental calls to the emergency number can arise for any number of reasons. For example, an unsupervised child playing with a wired or wireless phone may accidently dial the emergency number. Such a situation can be further exacerbated by the fact that a lock screen on a wireless phone will not prevent such calls. As another example, a user may accidently dial the emergency number without even realizing they have done so (i.e. pocket dialing). Again, the fact that even a locked wireless phone can dial the emergency number bypasses safeguards on preventing a user from accidently making a call by locking their phone.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
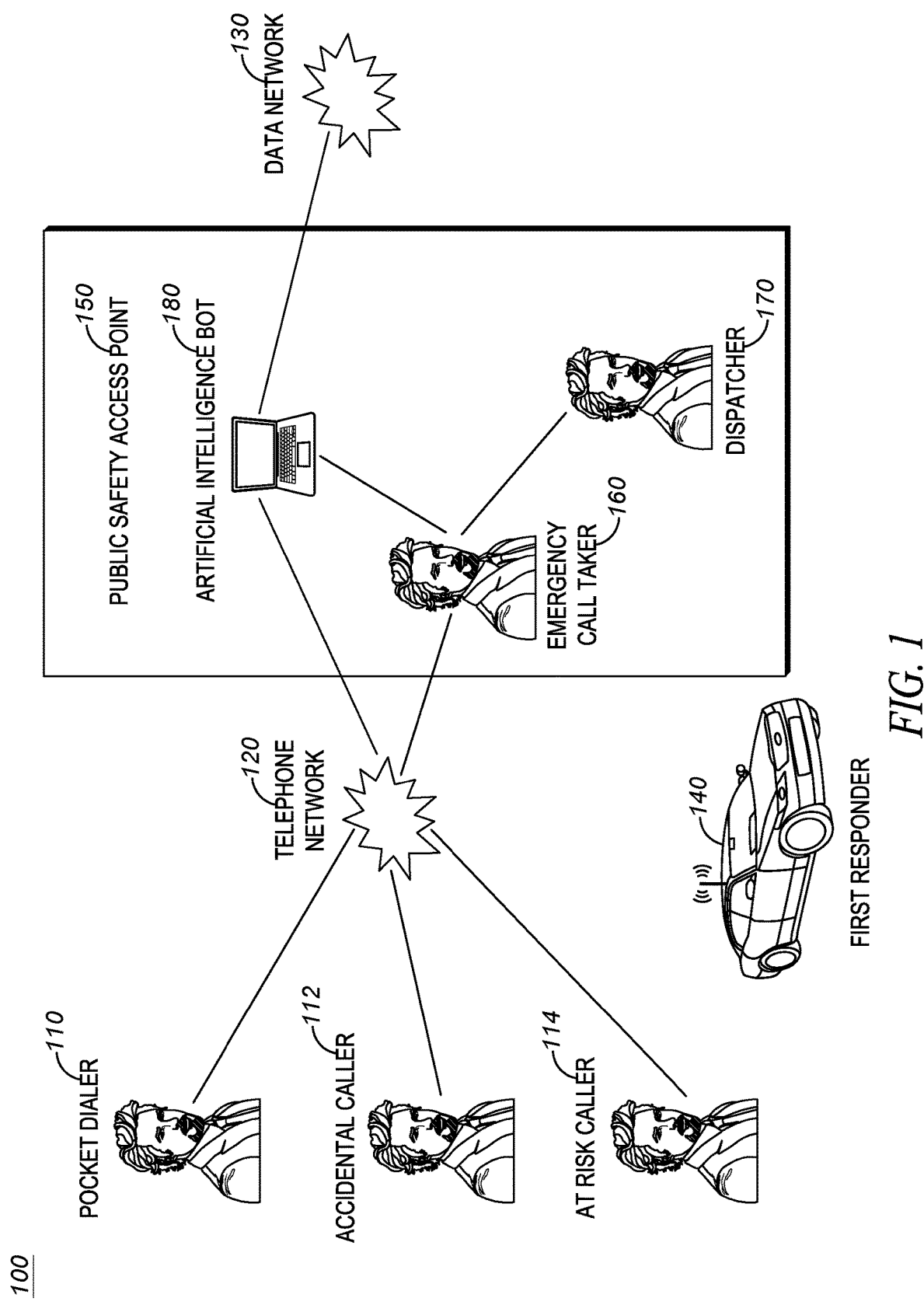
FIG. 1 is a block diagram of an example environment in which the techniques described herein may be used to automatically detect and resolve accidental emergency calls in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Although accidental emergency calls can be a burden on the emergency response system, every call must be treated as if it were a real emergency call. For example, a child who was playing with a phone and accidentally calls the emergency number may get scared when someone answers and immediately hang up the phone. The emergency call taker has no way of knowing if the termination of the call was intentional or if someone forced the caller to hang up against their will, thus preventing the caller from requesting emergency services. In the case of a pocket dial, the emergency call taker may be unable to elicit a response from the caller. The emergency call taker cannot know if the caller is not responding because they are unaware they placed a call, is experiencing some type of emergency (e.g. medical emergency) that is physically preventing a response, or is in a situation where verbally responding would put the caller at risk (e.g. a hostage situation).

Because the emergency call taker cannot definitively determine if a call that terminates prior to resolution by the emergency call taker is an accidental call or a legitimate emergency call, many localities require that further actions should be taken to verify the nature of the emergency call. Such a response can range from the emergency call taker attempting to make one or more return calls to the caller all the way to dispatching a first responder, such as police, fire, or EMS to the caller's location to physically determine if the call is associated with a legitimate emergency.

It should be clear that such follow up is wasteful of limited emergency response resources. If an emergency call taker is spending time attempting to call back an accidental caller, that is time that cannot be spent tending to new emergency calls. In addition, in certain high volume emergency call situations, there may not be sufficient call taking resources to handle the incoming volume of calls, meaning that answering new calls may be delayed. Likewise, a first responder responding to an accidental emergency call is not available to respond to real emergency calls. Provided herein are systems and methods for automatically detecting and resolving accidental emergency calls.

An example method for processing accidental emergency calls is provided herein. The example method includes monitoring an emergency call with an active learning artificial intelligence (AI) bot implemented by a processor. The example method further includes determining, by the AI bot, that the emergency call was disconnected prior to a call taker resolving the emergency call. The example method additionally includes providing, by the AI bot, a score indicative of the likelihood that the emergency call was an accidental call, wherein the call may be based on real-time and historical data. The example method also includes recommending, by the AI bot, a response to the emergency call based upon the score.

In one aspect at least one automated call back may be attempted by the AI bot based on the score. In another aspect, a confidence level of the emergency being accidental may be provided based on at least the score and historical data. In yet another aspect, an indication that the call was accidental or not may be provided, wherein the AI bot updates the historical data based on the indication in order to actively learn from each emergency call. Real-time data may include the duration of the call, natural language content of emergency call conversation, caller location, and background noise. Historical data may include caller accidental call history, crime history in the vicinity of the caller's location, and computer aided dispatch information.

An example non-transitory processor readable medium containing a set of instructions thereon which when executed by a process cause the processor to monitor an emergency call with an active learning Artificial Intelligence (AI) bot is provided herein. The example medium further includes instructions to determine, by the AI bot, that the emergency call was disconnected prior to a call taker resolving the emergency call. The example medium also includes instructions to provide, by the AI bot, a score indicative of the likelihood that the emergency call was an accidental call, wherein the score is based on real-time and historical data. The example medium additionally includes instructions to recommend, by the AI bot, a response to the emergency call based upon the score.

An example system for processing accidental emergency calls is provided herein. The example system includes a processor and a memory containing instructions which when executed by the processor cause the processor to monitor an emergency call with an active learning Artificial Intelligence (AI) bot. The memory of the example system also includes instructions to determine, by the AI bot, that the emergency call was disconnected prior to a call taker resolving the emergency call. The memory of the example system further includes instructions to provide, by the AI bot, a score indicative of the likelihood that the emergency call was an accidental call, wherein the score is based on real-time and historical data. The memory of the example system additionally includes instructions to recommend, by the AI bot, a response to the emergency call based upon the score.

FIG. 1 is a block diagram of an example environment in which the techniques described herein may be used to automatically detect and resolve accidental emergency calls in accordance with some embodiments. Environment 100 may include public safety access point (PSAP) 150, callers to an emergency number 110, 112, 114, telephone network 120, data network 130, and first responder 140.

PSAP 150 may be a location where calls to the emergency number are answered by emergency call takers 160. Although only a single emergency call taker 160 is shown in FIG. 1, it should be understood that there may be any number of emergency call takers. Additionally, although only a single PSAP 150 is depicted in FIG. 1, it should be understood that each locality may have one or more PSAPs. Furthermore, although PSAP 150 is depicted as a standalone physical location, it should be understood that the techniques described herein are not limited to such locations. In some cases, PSAP 150 may be distributed across many physical locations. In other cases, PSAP 150 may take on a virtual presence, with emergency call takers 160 answering calls on portable devices. PSAP 150 may also be co-located with other functions, such as at a police or fire station. The techniques described herein are applicable to any location, physical or virtual, where emergency calls are processed.

PSAP 150 may also include dispatcher 170. Although only a single dispatcher 170 is shown, it should be understood that there be any number of dispatchers. Just as with emergency call takers 160, dispatchers 170 may be located at a physical PSAP or may be distributed throughout various locations. In some cases, emergency call taker 160 may also be dispatcher 170.

Environment 100 may also include first responder 140. Although only a single first responder 140 is shown, it should be understood that any number of first responders 140 may be present in environment 100. First responders 140 may typically include personnel from a police department, a fire department, or emergency medical services (EMS). Although police, fire, and EMS are the most typical first responders 140, the techniques described herein are not so limited.

Dispatchers 170 may be charged with directing first responders 140 to the location of potential emergencies. For example, emergency call taker 160 may receive an emergency call and determine that the incident requires a police response. This information, along with the location of the incident, may be passed along to dispatcher 170. Dispatcher 170 may then direct first responder 140 to go to the location of the incident.

PSAP 150 may also include Artificial Intelligence (AI) bot 180. AI bot 180 may be a computer application that utilizes machine learning to perform the tasks that provide for the ability of PSAP 150 to automatically detect and respond to accidental emergency calls, as will described in further detail below. An example structure for AI bot 180 is described in further detail with respect to FIG. 3. Environment 100 may also include data network 130 coupled to the AI bot. For example, data network 130 may be the Internet. AI bot 180 may use data network 130 to obtain information that may be used in the detection and resolution of accidental emergency calls.

Environment 100 may also include telephone network 120. Telephone network 120 may be a public switched telephone network (PSTN) that may provide traditional, wired, landline phone service. Telephone network 120 may also be a telephony network provided by a cellular or mobile telephone provider. Telephone network 120 may also be a network provided by a cable television provider. In some cases, telephone network 120 may be a private intranet or the public Internet. Telephone network 120 may be coupled to PSAP 150 and may allow emergency calls to be delivered to emergency call takers 160. The particular form of telephone network 120 is unimportant. What should be understood is that telephone network 120 allows incoming emergency calls to be delivered to emergency call takers 160, and additionally allows return calls, also referred to as callbacks, to be made by the PSAP 150 to emergency callers 110, 112, 114. Such functionality is described in further detail below.

For purposes of explanation, environment 100 includes three example emergency callers. Pocket dialer 110 may be a person who has accidentally "pocket dialed" the emergency number, and is not even aware of having done so. For example, as mentioned above, due to certain constraints placed on mobile phones, it has become relatively easy to "pocket dial" the emergency number. In a typical pocket dial, the emergency call taker 160 is able to hear sounds (often muffled as the phone may be in a pocket) generated in the caller's environment. The "pocket dialer" is generally unable to hear the emergency call taker 160, because the caller will typically not know an emergency call has been placed and as such will not have the phone speaker in an appropriate position (e.g. in close proximity to the caller's ear). Thus, attempts by an emergency call taker 160 to speak with the pocket dialer may be ineffective.

Accidental caller 112 may be a person who has accidentally called the emergency number without being involved in an actual emergency. For example, a child playing with a phone may accidently call the emergency number. In many cases, the accidental caller 112 may panic out of fear of punishment for calling the emergency number without having a valid reason and hang up the phone when emergency call taker 160 answers. In some cases, accidental caller 112 may not even be a human. For example, there have been cases in which an animal, such as a pet, have caused a call to the emergency number of be placed.

At risk caller 114 may be a person who has intentionally called the emergency number because they are experiencing an emergency situation. However, at risk caller 114 may not be able to communicate with the emergency call taker 160 due to the nature of the emergency. For example, at risk caller 114 may be experiencing a medical emergency and is unable to speak due to the nature of that emergency (e.g. having a heart attack). As another example, at risk caller 114 may be in a building that is on fire and has passed out from smoke inhalation prior to the emergency call taker 160 answering the emergency call. In some cases, at risk caller 114 may be placing her own safety in jeopardy if they communicate with the emergency call taker 160. For example, in a hostage situation, at risk caller 114 may be able to surreptitiously dial the emergency number, but would not be able to actually speak to the emergency call taker 160. Just as above with respect to the pocket dialer 110, the emergency call taker 160 would be able to hear sounds generated in at risk caller 114's environment.

In operation, one of callers 110, 112, or 114 may dial the emergency number from their telephone. It should be understood that use of telephone as an example device is intended for ease of description, and not by way of limitation. The caller may use any suitable device for accessing the emergency number, such as mobile phones, landline phones, computer based phones, or any other device capable of connecting an emergency caller with PSAP 150. As explained above, the emergency call taker 160 may be unable to communicate with the caller, as the caller may be unaware they called (pocket dialer 110), unwilling to respond (accidental caller 112), or unable to respond (at risk caller 114). In some cases, the emergency caller may begin to communicate with the emergency call taker 160, but then stops. For example, at risk caller 114 may be experiencing a medical emergency and may pass out prior to providing the emergency call taker 160 with all necessary information. AI bot 180 may monitor all emergency calls handled by emergency call taker 160.

Emergency call taker 160 may be unable to resolve the emergency call because the emergency caller is not responding for the reasons described above. In a case where the emergency caller is no longer responding to emergency call taker 160, the emergency call may be referred to as an emergency call that was disconnected prior to the emergency call taker 160 resolving the emergency call. Although the term "disconnected" is used, this does not necessarily mean that the emergency caller has hung up the phone. Instead, what should be understood is that a disconnected emergency call is one in which there is no additional communication from the emergency caller, thus preventing the emergency call taker 160 from resolving the call. AI bot 180 may be used to determine that the emergency call was disconnected prior to an emergency call taker 160 resolving the emergency call.

As mentioned above, most localities have rules that require that there be a response for emergency calls that are disconnected prior to being resolved. The response may be to place a call back to the emergency caller to try and obtain additional information. Another response may be for the emergency call taker 160 to request dispatcher 170 to dispatch first responder 140 to the location of the emergency caller (many PSAP 150s include the capability of identifying an emergency caller's location from the mere act of placing an emergency call).

AI bot 180 may provide a score indicative of the likelihood that the emergency call was an accidental call. The score may be based on real-time and historical data. The use of real time and historical data in generating the score is described in further detail below.

In addition to providing a score indicative of the likelihood the emergency call was an accidental call, AI bot 180 may also recommend a response to the emergency call based on the score. For example, if the score indicates a high likelihood that the emergency call was accidental, then the recommendation may be to conserve first responder 140 resources by attempting a call back to the emergency caller. As another example, if the score indicates a low likelihood that the emergency call was accidental, the recommendation may be to dispatch a first responder 140 to the emergency caller's location, if known. If the emergency caller's location is not known, the recommendation may be for emergency call taker 160 to call back the emergency caller to obtain key information (e.g. address) necessary to dispatch a first responder 140.

As mentioned above, time spent by emergency call taker 160 on call backs is time that emergency call taker 160 cannot spend on answering new calls, and may not be the most efficient use of resources. In some cases, the recommendation made by AI bot 180 based on the score may be to attempt an automated call back by the AI bot 180 itself, thus freeing emergency call taker 160 up to handle new emergency calls. AI bot 180 may attempt a call back to the emergency caller, in some cases using an automated voice response system. Such a system may allow AI bot 180 to receive feedback from the emergency caller (e.g. "An emergency call has been placed from this number. Please press 1 if you are experiencing an actual emergency.").

Although AI bot 180 may make a recommendation of a response based on the score, it should be understood that it is a recommendation. Emergency call taker 160 may always have the ability to override the recommendation of AI bot 180. In order to provide a further information to emergency call taker 160, AI bot 180 may provide a confidence level of the emergency call being an accidental call based on the score and historical data. For example, AI bot 180 may provide information such as the percentage of historical calls which were given a particular score or higher score that turned out to be accidental emergency calls (e.g. "85 percent of calls that were given this score or higher were determined to be accidental calls"). This information may be used by emergency call taker 160 to determine if the recommendation of AI bot 180 should be followed or if some other course of action should be taken.

Once the emergency call has been resolved (e.g. either by a successful call back, verification by a first responder 140, etc.) an indication that the emergency call was or was not an accidental emergency call may be provided to AI bot 180. AI bot 180 may update the historical data based on the indication in order to actively learn from each emergency call. For example, the model used by AI bot 180 to calculate the score may be automatically adjusted based on the feedback that is received about the actual resolution of the call. For example, if AI bot 180 model indicated a high likelihood that a given call was accidental, but the actual facts indicate that it was a legitimate emergency call, the model used by AI bot 180 may be adjusted so that the next time similar circumstances are encountered (e.g. similar real-time and historical data) the resultant score may not indicate as high a likelihood of the call being accidental. In some implementations, the historical data may be updated as soon as it is determined whether the emergency call was real or accidental. In other implementations, the feedback may be collected for a period of time (e.g. a week, a month) and the historical data may be updated in a batch mode.

Further details regarding the operation of AI bot 180, including examples of criteria that may be used in calculating a score and providing response recommendations are described below.

Figure 2:
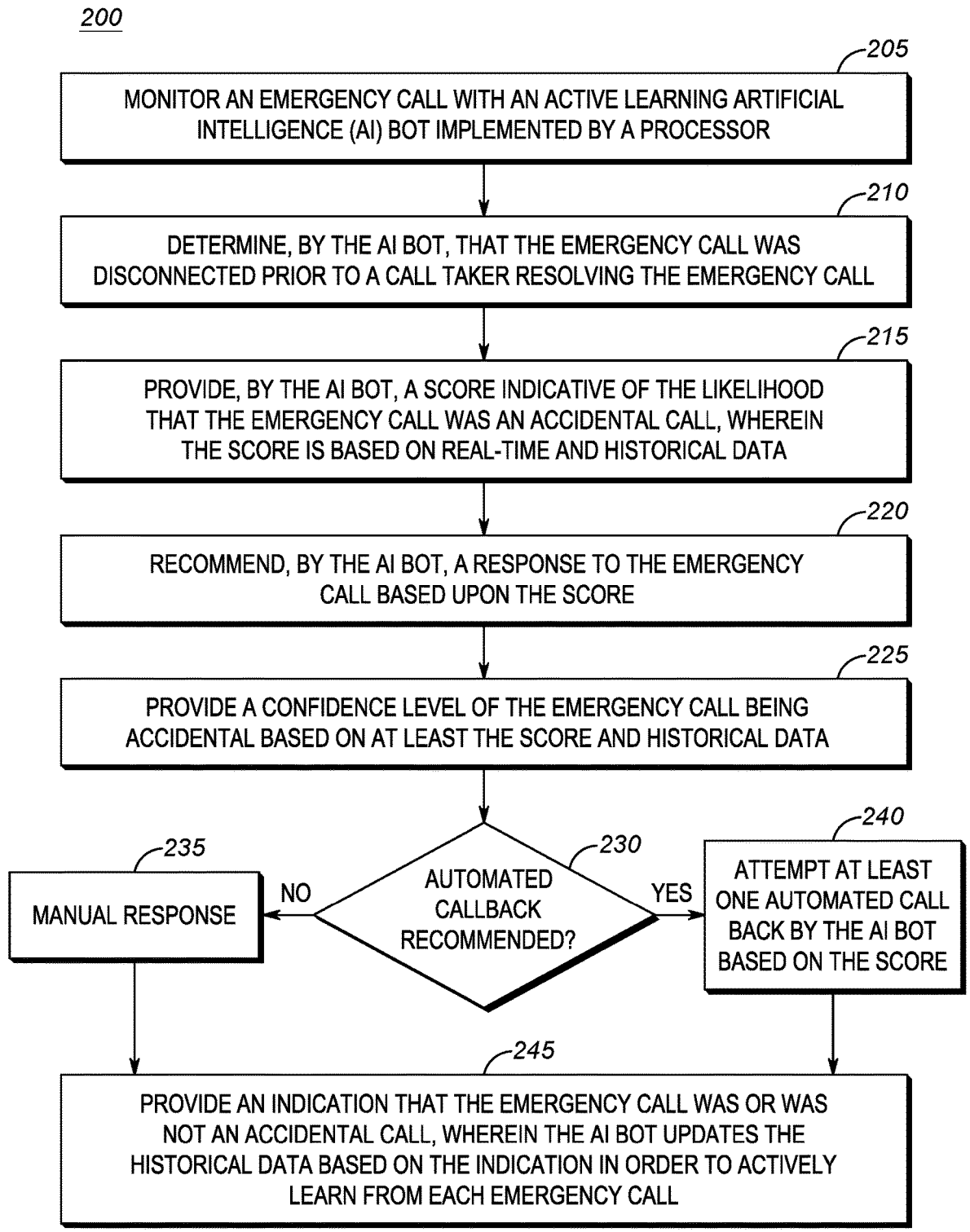
FIG. 2 is an example flowchart of a method of automatically detecting and resolving accidental emergency calls.

FIG. 2 is an example flowchart 200 of a method of automatically detecting and resolving accidental emergency calls. In block 205, an emergency call may be monitored with an active learning Artificial Intelligence (AI) bot that has been implemented by a processor. As described in FIG. 1, AI bot 180 may be coupled to the same telephone network 120 that is used by PSAP 150 to receive calls. As such, AI bot 180 may be coupled to all calls answered by emergency call taker 160 in order for the AI bot 180 to monitor all communications between emergency callers 110,112,114 and emergency call taker 160.

In block 210, it may be determined, by AI bot 180, that the emergency call was disconnected prior to emergency call taker 160 resolving the emergency call. In some implementations, this determination can be made by an indication provided by emergency call taker 160. For example, emergency call taker 160 may be provided with an electronic interface (e.g. a graphical user interface) to AI bot 180, wherein emergency call taker 160 can manually indicate the call was disconnected prior to resolution.

In other implementations, AI bot 180 may automatically determine the call was disconnected prior to resolution based on the call monitoring. For example, if the call duration was shorter than expected, this may indicate that the emergency caller hung up prior to resolution of the emergency call. Likewise, a lack of or insufficient response from the emergency caller may prevent resolution of the emergency call. For example, some key information may be needed to resolve an emergency call (e.g. location of incident, essence of incident type, level of criticality). Thus, resolution of the emergency call cannot be achieved until the key information is received. Until the key information is received, the emergency call may be considered unresolved. As yet another indicator that the emergency call is unresolved, as it would not be possible to take action, AI bot 180 may monitor the speech of the emergency call taker 160 and based on identification of certain words and phrases (e.g. "caller, are you there?") may conclude that the emergency call has been disconnected prior to resolution.

In block 215, a score indicative of the likelihood that the emergency call was an accidental call may be provided. The score may be based on real-time and historical data. For example, the real-time data used may be data such as the call duration. For example, excessively short emergency calls may be more likely to be accidental calls. Natural language processing of the calls may be used to determine the content of the conversation. For example, natural language processing may be utilized to determine if the content of the call uses language that would be similar to the language used in real emergency calls. Voice sentiment may also be used, for example, to attempt to establish the state of the emergency caller. A sentiment indicating higher levels of stress may be more likely to indicate a real vs accidental emergency call.

Other real time data from the call, other that voice and content analysis, may also be used. For example, the caller location may be utilized to determine if a call is likely to be accidental. For example, an emergency call from a high crime area or from a location with an at risk population (e.g. nursing home) may be more likely to be a real emergency call vs an accidental emergency call. Other information may include the time of day the call was placed. An emergency call placed in the middle of the night, when most people are asleep, may be more likely to be real rather than accidental.

Other information that may be utilized to determine if an emergency call was accidental may include things such as the phone background noise. For example, in the case of a pocket dial, the caller may not even realize they have called the emergency number. Thus, it would be expected that the emergency call taker 160 may simply be receiving the sounds of the emergency caller going about normal life (e.g. having non urgent conversations, sounds of someone driving or taking public transportation, generally not urgent background noises).

Background noise may also include information indicating a real emergency situation. For example, background noise of criminal activity (e.g. a hostage taker ordering everyone to lay on the floor, sounds of things burning in a fire incident, heavy or labored breathing in a medical emergency situation). The background noise of an emergency call may be utilized as one of the factors in determining if a call is an accidental emergency call.

Another factor that may be utilized is real time weather data. For example, if an area is experiencing severe inclement weather, it may be more likely that an emergency call was disconnected as a result of that weather (e.g. down trees/debris causing damage to communications systems).

Another rich source of real-time data that may be used to determine if an emergency call was accidental may be data received from social networking sites. For example, an emergency call may have been received from a given location. The same location may be referenced in real-time social media posts (e.g. a tweet saying, "something weird is happening at" that location). The fact that an emergency call is placed from a location where social media indicates something abnormal is going on may make it more likely the emergency call was not accidental. Likewise, real-time news reporting sites may also be used to provide real-time information that might be utilized in assessing if an emergency call was accidental or not.

In addition to real time data, historical data may also be used. For example, an emergency caller call history may be utilized to determine if a particular caller has a history of making accidental calls to the emergency number. A caller who has made numerous previous accidental emergency calls may make it more likely the current emergency call is an accidental call.

Another example of historical data may be the crime history in the vicinity of the emergency call. An emergency call coming from a location with an elevated history of crime may be more likely to be a true emergency than a call from other locations. Similarly, calls from locations with greater numbers of at risk people (e.g. the elderly in nursing homes, assisted living communities, retirement communities, etc.) may be more likely to be true emergency calls. Another example of historical data may include computer aided dispatch information. If a particular location has previously required repeated dispatch of first responders for actual emergencies, the likelihood that a call from that location may be accidental may be decreased.

In block 220, a recommendation may be provided by AI bot 180 for a response to the emergency call. The recommendation may be based on the score. The recommendation may include AI bot 180 making an automated call back to the emergency caller in order to obtain additional information that may be used to determine if the emergency call was accidental. Another recommendation may be for emergency call taker 160 to make a manual call back to the emergency caller. Yet another recommendation may be to recommend dispatcher 170 dispatch first responder 140 to the caller's location. It should be understood that the recommendation provided in block 220 is just that, a recommendation. In some implementations, emergency call taker 160 may use the recommendation as one of the inputs in determining the proper response. Emergency call 160 taker may always override the recommendation of AI bot 180.

In block 225, a confidence level of the emergency call being an accidental based on at least the score and the historical data may be provided. The score determined in block 215 may provide an indication of the likelihood that a given call is accidental, based on the real-time and historical data described above. In block 225, a confidence level in that score may be provided. For example, in one implementation, AI bot 180 may provide an indication of the percentage of times an emergency call with the same score or higher has been determined to be accidental. For example, AI bot 180 may provide an indication that a certain percentage of calls with a given score or higher have historically been shown to be accidental.

In other words, the score may be an indication based on the specific real-time and historical data about the likelihood that a given call is accidental. The confidence level may provide a further indication of how certain AI bot 180 is that the call is accidental.

In block 230, a decision may be made based on the recommendation provided in block 225. If an automated call back is not recommended, the process may move to block 235. If an automated call back is recommended, the process may move to block 240. Although block 230 is depicted as an automatic step, it should be understood that the output of block 225 is a recommendation for an automated call back. Emergency call taker 160 is at all times free to ignore the recommendation of AI bot 180 and proceed according to manual procedures. For example, is cases where a score indicates an automated call back should be performed, but the confidence level in that score is not sufficiently high, emergency call taker 160 may choose to proceed with a manual response.

In block 235 a manual response may be initiated. As explained above, different localities may have different procedures with respect to what occurs when an emergency call is disconnected prior to resolution by emergency call taker 160. In some areas, the mandated response may be emergency call taker 160 attempts to manually initiate a call back to the emergency caller. In other localities, the response may be dispatcher 170 is required to dispatch first responder 140 to the location from which the emergency call originated. The full range of possible manual responses is beyond the scope of the instant disclosure.

In block 240 at least one automated call back by AI bot 180 may be attempted based on the score. For example, if AI bot 180 has calculated a score for a disconnected emergency call based on the real-time and historical data as described above with respect to block 215, the score may indicate a high likelihood that the emergency call was an accidental call. If emergency call taker 160 agrees with the recommendation, AI bot 180 may be tasked with attempting a call back to the emergency caller.

AI bot 180 may call back the emergency caller through telephone network 120. If the emergency caller answers the phone, AI bot 180 may provide an automated voice system to attempt to gain further information that may be used to determine if the call was an accidental call. For example, AI bot 180 may play a message to the caller explaining that an emergency call was placed from the number being called back. AI bot 180 may prompt the user to indicate if there is an actual emergency in progress. For example, AI bot 180 may prompt the user to "press or say 1" if you are experiencing an actual emergency.

AI bot 180 may additionally use the same monitoring techniques as were described in block 215, in which real-time and historical data may be used to determine if an emergency call was accidental. For example, the emergency caller may have been able to answer the phone, but is unable to speak (e.g. at risk caller 114). AI bot 180 may monitor real-time factors, such as background sounds, to determine if the background sounds are consistent with an actual emergency event. Likewise, data network 130 may be used to gather data from external sites, such as social networking sites, to see if there have been reports of an emergency incident in the area of the caller's location. For example, if social networking or news sites indicate a disturbance of some nature in an area near the emergency caller's location, this may be indicative of an emergency caller involved in a true emergency as opposed to an accidental call.

In some cases, there may be no response to the automated call back made by AI bot 180. Regardless of the outcome of the automated call back, the result may be presented to emergency call taker 160. For example, if the automated call back was able to determine with a high degree of confidence that the call was an accidental call, this information may be relayed back to emergency call taker 160. Likewise, if the results of the call back indicate a very low likelihood that the emergency call was an accidental emergency call, this information can also be passed back to emergency call taker 160. Emergency call taker 160 may then make a decision on how to proceed based on the additional information.

In some cases, the response may be to attempt another automated call back by AI bot 180. In other case, the response may be to switch to the manual response procedures described in block 235. In addition, as described above, in some implementations, if AI bot 180 is able to determine with sufficiently high confidence that an emergency call is not accidental, AI bot 180 itself may trigger a response, such as instructing dispatcher 170 to dispatch a first responder 140 to the emergency caller's location. Likewise, if AI bot 180 is able to determine the call was an accidental call with sufficiently high confidence, then the response may be to take no further action.

In block 245, regardless of if an automated or manual response was previously triggered, an indication that the emergency call was or was not an accidental emergency call may be provided to AI bot 180. AI bot 180 may then update the historical data based on the indication in order to actively learn from each emergency call. For example, if AI bot 180 had provided a score indicative that a call was likely an accidental call, but reality indicated that it was a true emergency call, AI bot 180 may update its historical data and model to reflect this fact. The next time AI bot 180 is monitoring an emergency call with the same or similar real-time and historic data, the score provided may be less likely to indicate an accidental call.

If the score provided indicated the call was likely a true emergency call, but reality determined that the call was an accidental call, the historical data can then be modified such that future monitored calls with the same or similar real-time and historic data may get a score more likely to indicate that the emergency call was accidental.

In cases where AI bot 180 provided a score that was consistent with reality (e.g. accidental emergency call predicted/was actually an accidental call or true emergency predicted/was actually a true emergency) the historical data may be modified such that new emergency calls with the same or similar real-time and historic data are even more likely to get a score that is consistent with the fact that AI bot 180 was able to correctly predict the nature of the disconnected emergency call.

Figure 3:
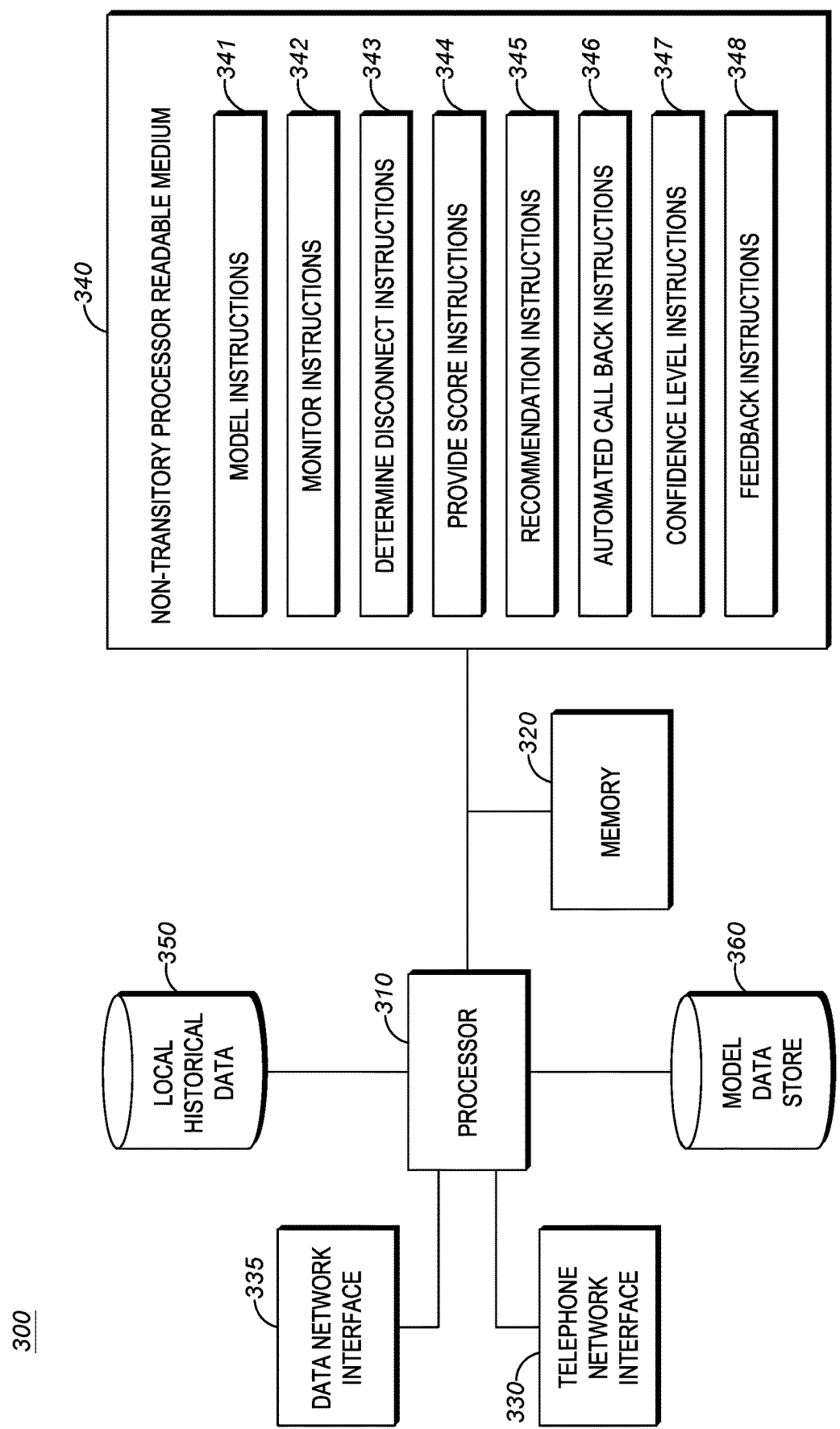
FIG. 3 is an example of a block diagram of a processor platform that may execute instructions to implement a system that may be used to automatically detect and resolve accidental emergency calls.

FIG. 3 is an example of a block diagram of a processor platform 300 that may implement the techniques described herein. Processor platform 300 may implement AI bot 180 that has been described above. Processor platform may include a processor 310, memory 320, telephone network interface 330, data network interface 335, non-transitory processor readable medium 340, historical data store 350, and model data store 360.

Processor 310 may be any type of processor that may execute instructions that cause processor platform 300 to implement the techniques described herein. Processor 300 may be coupled to memory 320 which may store instructions executed by the processor 310. In some implementations, memory 310 may be a volatile random access memory (RAM), although the techniques described herein are not dependent on any specific type of memory. Processor 310 may cause memory 320 to be loaded with processor 310 executable instructions that implement the techniques described herein. In some implementations, processor 310 may load memory 320 with instructions stored on non-transitory processor readable medium 340. Non-transitory processor readable medium 340 is described in further detail below.

Processor 310 may be couple to telephone network interface 330. As described above, AI bot 180 which is included as part of PSAP 150 may have a connection to a telephone network 120. The connection to telephone network 120 may allow AI bot 180 to monitor emergency calls that are received by PSAP 150. In addition, the connection to telephone network 120 may allow the AI bot 180 to initiate call backs to emergency callers. Processor 310 may access telephone network 120 through telephone network interface 330.

Processor 310 may also be coupled to data network interface 335. As explained above AI bot 180 may make use of real time and historic data in order to calculate a score and provide a recommendation for accidental emergency calls. Processor 310 may access repositories of historical data (e.g. data stored in archives, databases, etc.) that may be accessible via data network 130, such as the Internet. AI bot 180 may also access real-time data (e.g. data from social networks, real-time camera feeds, real-time news reporting) via data network 130, such as the Internet. Processor 310 may access these data networks through data network interface 335.

Processor 310 may also be coupled to local historical data store 350. Historical data store 350 may be used to store historical data that is relevant to emergency callers. As explained above, such data can include information such as a history of accidental calls from a particular location, known presence of individuals with various physical or mental issues that may be relevant to accidental emergency calls, etc. Local historical data store 350, real-time data and historical data obtained through data interface 335, and audio data obtained via telephone network interface 330 may be used as inputs to an accidental call model used by AI bot 180 to implement the techniques described herein. The accidental call model is described in further detail below.

Processor 310 may also be coupled to non-transitory processor readable medium 340. Medium 340 may contain a set of instructions thereon which when executed by a processor 310 cause the processor to implement the techniques described herein. It should be understood that the instructions stored on medium 340 collectively implement the AI bot 180.

Medium 340 may include model instructions 341. Processor 341 may utilize model instructions 341 to implement the training model used by AI bot 180 in order to provide scores and confidence levels. Model instructions 341 may receive all inputs from an emergency call, such as length, natural language processing of the call, real-time and historical data related to the call, including data from social media networks and public news sources, in order to provide the score, confidence levels, and recommendations. Model instructions 341 may also receive feedback once an emergency call has been determined to be accidental or not. This feedback information may be utilized by the AI bot 180 to actively learn from each emergency call processed and update the model instructions accordingly. Thus, as more and more emergency calls are processed, model instructions are continuously refined as new information is received.

The model instructions 341 may be utilized by the processor to update model data store 360. Model data store may contain the model utilized by the AI bot 180 for providing a score, confidence level, and recommendation to the emergency caller. Model data store 360 may be continuously refined as additional emergency calls are processed and based on feedback received from the accuracy of the AI bot's score and recommendations. Thus, the model data store is continually updated in order to actively learn as new data becomes available.

Medium 340 may include monitor instructions 342. Monitor instructions 342 when executed by processor 310 may cause the processor to utilize telephone network interface 330 to monitor calls to the emergency number. In addition, monitor instructions 342 may also be used to monitor outgoing calls, such as call backs to emergency callers. As explained above, monitoring can include natural language processing to obtain a sentiment for the call. Monitoring can also include keyword identification. Monitoring may also include analyzing ambient noise being received from the emergency caller to determine if the background noise is consistent with an accidental emergency call. The result of monitoring emergency calls may be utilized by the model instructions in order to calculate a score for the emergency call and provide a recommendation to the emergency call taker 160.

Medium 340 may include determine disconnect instructions 343. Processor 310 may utilize determine disconnect instructions 343 to determine that an emergency call was disconnected prior to an emergency call taker resolving the emergency call. For example, instructions 343 may be used to determine that the length of the emergency call was too short for the call to have been resolved, the content of the conversation did not indicate the call has been resolved (using monitor instructions 342), a manual indication from the emergency call taker 160, or any other mechanism to determine the emergency call was disconnected prior to resolution. The result of determining disconnected emergency calls may be utilized by the model instructions in order to calculate a score for the emergency call and provide a recommendation to the emergency call taker 160.

Medium 340 may also include provide score instructions 344. Processor 310 may utilize provide score instructions 344 to provide a score indicative of the likelihood that an emergency call was an accidental call. The score may be based on real-time and historical data. For example, data that is accessible from local historical data 350, through processing, such as natural language processing, of data received via the telephone network interface 330, or via data received via the data network interface 335. All of this data may be processed in accordance with model instructions 341 in order to provide a score.

Medium 340 may also include recommendation instructions 345. Processor 310 may utilize recommendation instructions 345 in order to provide the emergency call taker with a recommendation as to what to do with an emergency call that has been disconnected prior to resolution. As mentioned above, the recommendation may be based on the score provided using instructions 344 and the model instructions 341. Recommendations may include attempting one or more automated call backs to the emergency caller, attempting a manual call back by the emergency call taker, or dispatching a first responder to the caller's location.

Medium 340 may include automated call back instructions 346. Processor 310 may utilize automated call back instructions 346 in order to attempt at least one automated call back by AI bot 180. AI bot 180 may utilize telephone network interface 330 in order to place the call back over telephone network 120. The automated call back instructions may allow processor 310 to place a call back to the emergency caller and analyze the response. As above, the response may be analyzed for background noises, using natural language processing, using keyword detection, prompting the emergency caller for answers to various questions, or any other type of information that may be utilized to determine the nature of the emergency call.

Medium 340 may also include confidence level instructions 347. Processor 310 may utilize confidence level instructions 347 in order to provide a confidence level of the emergency call being accidental based on the score and the historical data. The historical data may be retrieved from local historical data 350 or from data network interface 335. The confidence level may be used to indicate the probability or percentage of calls with similar or higher scores turned out to be accidental calls.

Medium 348 may also include feedback instructions. Processor 310 may use feedback instructions 348 in order to provide an indication that the emergency call was or was not an accidental call. The AI bot 180 may update the local historical data 350 based on the indication in order for the model instructions 341 to actively learn from each emergency call. As such, the feedback instructions 348 allows the AI bot 180 to continuously use the feedback for each emergency call to continuously improve the model used to calculate a score.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for processing accidental emergency calls comprising:
   monitoring an emergency call with an active learning Artificial Intelligence (AI) bot implemented by a processor, the AI bot included in a public safety answering point;
   determining, by the AI bot, that the emergency call was disconnected prior to a call taker resolving the emergency call;
   providing, by the AI bot, a score indicative of the likelihood that the emergency call was an accidental call, wherein the score is based on real-time and historical data; and
   recommending, by the AI bot, a response to the emergency call based upon the score.

2. The method of claim 1, further comprising:
   attempting at least one automated call back by the AI bot based on the score.

3. The method of claim 1, further comprising:
   providing a confidence level of the emergency call being accidental based on at least the score and historical data.

4. The method of claim 1, further comprising:
   providing an indication that the emergency call was or was not an accidental call, wherein the AI bot updates the historical data based on the indication in order to actively learn from each emergency call.

5. The method of claim 1 wherein real-time data comprises:
   duration of the emergency call;
   natural language content of emergency call conversation; and
   caller location.

6. The method of claim 1 wherein real-time data comprises:
   emergency call background noise.

7. The method of claim 1 wherein historical data comprises:
   caller accidental call history;
   crime history in the vicinity of caller's location; and
   computer aided dispatch information.

8. A non-transitory processor readable medium containing a set of instructions thereon which when executed by a processor cause the processor to:
   monitor an emergency call with an active learning Artificial Intelligence (AI) bot, the AI bot included in a public safety answering point;
   determine, by the AI bot, that the emergency call was disconnected prior to a call taker resolving the emergency call;
   provide, by the AI bot, a score indicative of the likelihood that the emergency call was an accidental call, wherein the score is based on real-time and historical data; and
   recommend, by the AI bot, a response to the emergency call based upon the score.

9. The medium of claim 8, further comprising instructions to:
   attempt at least one automated call back by the AI bot based on the score.

10. The medium of claim 8, further comprising instructions to:
    provide a confidence level of the emergency call being accidental based on at least the score and historical data.

11. The medium of claim 8, further comprising instructions to:
    provide an indication that the emergency call was or was not an accidental call, wherein the AI bot updates the historical data based on the indication in order to actively learn from each emergency call.

12. The medium of claim 8 wherein real-time data comprises:
    duration of the emergency call;
    natural language content of emergency call conversation; and
    caller location.

13. The medium of claim 8 wherein real-time data comprises:
    emergency call background noise.

14. The medium of claim 8 wherein historical data comprises:
    caller accidental call history;
    crime history in the vicinity of caller's location; and
    computer aided dispatch information.

15. A system for processing accidental emergency calls comprising:
    a processor; and
    a memory containing instructions which when executed by the processor cause the processor to:
       monitor an emergency call with an active learning Artificial Intelligence (AI) bot the AI bot included in a public safety answering point;
       determine, by the AI bot, that the emergency call was disconnected prior to a call taker resolving the emergency call;
       provide, by the AI bot, a score indicative of the likelihood that the emergency call was an accidental call, wherein the score is based on real-time and historical data; and
       recommend, by the AI bot, a response to the emergency call based upon the score.

16. The system of claim 15, further comprising instructions to:
    attempt at least one automated call back by the AI bot based on the score.

17. The system of claim 15, further comprising instructions to:
    provide a confidence level of the emergency call being accidental based on at least the score and historical data.

18. The system of claim 15, further comprising instructions to:
    provide an indication that the emergency call was or was not an accidental call, wherein the AI bot updates the historical data based on the indication in order to actively learn from each emergency call.

19. The system of claim 15 wherein real-time data comprises:
duration of the emergency call;
natural language content of emergency call conversation; and
caller location.

20. The system of claim 15 wherein historical data comprises:
caller accidental call history;
crime history in the vicinity of caller's location; and
computer aided dispatch information.

* * * * *